(12) United States Patent
Rappoport et al.

(10) Patent No.: US 6,590,011 B1
(45) Date of Patent: Jul. 8, 2003

(54) RADIATION INITIATED EPOXY-AMINE SYSTEMS

(75) Inventors: Leonid Rappoport, Mountain View, CA (US); Alex Vainer, Fremont, CA (US); Aleksander Yam, Sunnyvale, CA (US)

(73) Assignee: Polymeright, Inc., Fremont, CA (US)

( * ) Notice: Subject to any disclaimer, the term of this patent is extended or adjusted under 35 U.S.C. 154(b) by 17 days.

(21) Appl. No.: 09/846,448

(22) Filed: Apr. 30, 2001

Related U.S. Application Data

(60) Provisional application No. 60/200,753, filed on May 1, 2000.

(51) Int. Cl.[7] ............................. C08F 2/46; C08F 2/50
(52) U.S. Cl. ................. 522/170; 522/168; 522/169; 522/181; 522/14; 522/65; 522/68; 522/69; 522/31; 522/30; 522/38; 522/7; 522/6
(58) Field of Search ........................... 522/100, 170, 522/181, 14, 79, 83, 65, 68, 69, 167, 168, 31, 30, 38, 7, 6

(56) References Cited

U.S. PATENT DOCUMENTS

| | | | | |
|---|---|---|---|---|
| 3,622,482 A | * | 11/1971 | Trecker et al. | 524/292 |
| 4,000,148 A | * | 12/1976 | Pond et al. | 72/482.93 |
| 4,447,586 A | * | 5/1984 | Shimp | 252/182.13 |
| 4,510,290 A | | 4/1985 | Kirchmayr et al. | 525/162 |
| 4,540,750 A | * | 9/1985 | Ham | 525/504 |
| 4,593,056 A | | 6/1986 | Qureshi et al. | 523/445 |
| 4,636,431 A | | 1/1987 | DeBergalis | 428/327 |
| 4,636,575 A | | 1/1987 | Kirchmayr | 558/58 |
| 4,668,758 A | * | 5/1987 | Corley | 528/408 |
| 4,749,726 A | * | 6/1988 | Gupta et al. | 522/4 |
| 4,775,736 A | * | 10/1988 | Wiggins | 252/182.13 |
| 4,925,901 A | * | 5/1990 | Bertram et al. | 525/482 |
| 4,945,001 A | * | 7/1990 | Gupta et al. | 428/412 |
| 5,393,806 A | * | 2/1995 | Azarnia | 264/137 |
| 5,516,813 A | * | 5/1996 | Starkey | 522/170 |
| 5,541,000 A | * | 7/1996 | Hardy et al. | 428/413 |
| 5,892,118 A | | 4/1999 | Kawachi et al. | 564/443 |

* cited by examiner

Primary Examiner—James J. Seidleck
Assistant Examiner—Sanza L. McClendon
(74) Attorney, Agent, or Firm—Lumen Intellectual Property Services, Inc.

(57) ABSTRACT

An epoxy-amine composition includes an epoxy resin, an amine curative and a latent catalyst. The latent catalyst does not cause the instant acceleration of the reaction between epoxides and amines. In the presence of radiation, the latent catalyst generates an active catalyst that accelerates/initiates the cure process of the epoxy-amine composition.

16 Claims, 2 Drawing Sheets

RADIATION INITIATED EPOXY-AMINE SYSTEMS

CROSS-REFERENCE TO RELATED APPLICATIONS

This application is based on Provisional application 60/200,753, filed May 1, 2000, which is herein incorporated by reference.

FIELD OF THE INVENTION

This invention relates generally to epoxy-amine systems. More particularly, it relates to radiation-initiated epoxy-amine systems.

BACKGROUND ART

The three dimensional epoxy-amine network produced by the curing of amine-epoxy resin formulations is well known to exhibit desirable mechanical and thermal properties. As a result, amine-curable epoxy resin systems have been widely used as coatings, adhesives, sealants and matrices for fiber-reinforce composites. For each application, the epoxy-amine resin formulation must possess a particular degree of reactivity. In many cases, the reaction rate must be increased, and cure accelerators are added.

Normally, the epoxy-amine compositions are marketed as a two-part system with the first part containing the epoxy resin and the second part containing the amine curative and cure accelerator. It is highly desirable to market a one-part system in which the epoxy resin, amine curative, cure accelerator and other components are blended together under controlled conditions or a two-part system with a prolonged pot life and accelerated cure. Such a system could eliminate costly field mixing by the consumer who in many instances does not have the proper equipment to institute a thorough blend of the components and/or a proper appreciation of the need to make and apply a homogeneous mixture of the components for optimum results.

Considerable efforts have been made to improve one-part epoxy-amine resin systems by adding various additives thereto. It has been found that various Lewis acids, Lewis bases, and numerous salts and complexes are added into the epoxy-amine systems as accelerators. Such accelerators, while improving the cure speed, have been found to adversely affect the working life of the system as well as complicate the work with significant volumes of materials.

Various mono- and di-hydroxy substituted aromatic compounds (i.e. phenols, resorcinols and their derivatives) are also effective in increasing the cure speed of glycidyl epoxy-amine mixtures.

Sterically hindered amine curatives, such as substituted toluenediamines, are used to produce epoxy-amine formulations with prolonged pot life (i.e., the length of time during which an adhesive, after being mixed with catalyst and/or curing agent, remains suitable for use). However, conventional formulations with such "slow" amines require curing at a temperature of over 150° C. for several hours. Therefore, the use of a catalyst is necessary. One of the most common catalysts used in such systems are derivatives of phenol, such as salicylic acid, resorcinol, and nonylphenol. The catalytic activity of these compounds results from the presence of the phenolic hydroxyl groups. Unfortunately, an addition of such catalysts causes the immediate acceleration of the chemical interaction between epoxides and amines, resulting in epoxy-amine formulations with extremely limited shelf life (i.e., the length of time an unopened package of adhesive can be expected to remain in usable condition under specific conditions of temperature and humidity), and very short pot life.

U.S. Pat. No. 4,593,056, issued to Qureshi et al. on Jun. 3, 1986, discloses a curable thermosetting resin composition including an epoxy resin, an aromatic diamine hardener, and an aromatic trihydroxy compound as a cure accelerator. However, the trihydroxy compound causes immediate acceleration of the chemical interaction between epoxides and amines, resulting in extremely limited shelf life and very short pot life of such composition.

U.S. Pat. No. 4,510,290 and 4,636,575, issued to Kirchmayr et al. on Apr. 9, 1985 and Jan. 13, 1987, respectively, disclose a one-component acid-curable composition containing an acid-curable resin and a latent curing catalyst which is activated by the UV radiation. The resin is an amino resin or a phenolic resin, or a mixture of an amino resin or a phenolic resin with an alkyd, polyester or acrylic resin.

Kirchmayr's acid-curable composition further includes a "blocked UV absorber", such as resorcinol monobenzoate or certain salicylic acid esters, which while absorbing UV energy, undergo a Photo-Fries rearrangement. However, Kirchmayr's latent curing catalysts are un-suitable for epoxy-amine systems.

U.S. Pat. No. 4,636,431, issued to DeBergalis on Jan. 13, 1987, discloses a coating composition including a polymer containing an epoxy group provided by glycidyl methacrylate and resorcinol monobenzoate. The resorcinol monobenzoate can be bonded to the polymer through hydroxyl group on the resorcinol monobenzoate. The resulting polymer-bound resorcinol monobenzoate, when subjected to ultraviolet radiation, absorbs part of the radiation and undergoes a Photo-Fries rearrangement to produce polymer-bound dihydroxy benzophenone. However, DeBergalis only uses Photo-Fries rearrangement for scavenging UV radiation in cured polymers.

There is a need, therefore, for a one-component epoxy-amine composition having a prolonged shelf and/or pot life.

OBJECTS AND ADVANTAGES

Accordingly, it is a primary object of the present invention to provide an epoxy-amine composition having a prolonged shelf and/or pot life.

It is another object of the present invention to provide an epoxy-amine composition floating for a sufficiently long time after the initiation and curing, thus allowing processing of large bodies with complicated profiles, including the filling of narrow channels.

It is a further object of the present invention to provide an epoxy-amine composition useful for the preparation of premixes, prepregs, laminates and composites, etc.

SUMMARY

The present invention is directed to epoxy-amine compositions having prolonged shelf life and/or pot life through the use of "hidden" or latent catalysts or curing agents.

An epoxy-amine composition of the present invention includes an epoxy resin, an amine curative, and a catalytic system.

The catalytic system does not cause the instant acceleration of the reaction between epoxides and amines. Rather, in the presence of radiation, such as visible light, ultraviolet (UV) light or an electron beam, the latent catalyst or latent curing agent undergoes photo-Fries rearrangement to generate an active catalyst or active curing agent that accelerates/initiates the cure process of the epoxy-amine composition.

The presence of photosensitizers, such as anthracene, pyrene, and benzophenone, promotes more effective active catalyst generation.

The epoxy resin means compounds with terminal epoxy groups, preferably glycidyl ethers of bis-phenol A and bis-phenol F or novolacs. The amine curative preferably contains a substituted toluenediamine, such as dimethylthiotoluenediamine and diethyltoluenediamine. The catalyst preferably consists of esters of phenols and esters of derivatives of phenols, such as acetylsalicylic acid, resorcinol monoacetate, resorcinol monobenzoate, diacetate of bis-phenol A, phenyl acetate, phenyl benzoate, naphtyl acetates, and resorcinol diacetate.

The epoxy-amine composition further can include a proton-accepting compound containing oxygen atoms for inhibiting the interaction among the catalyst, epoxides and amines. The proton-accepting compound preferably includes 2,4,6-trimethylbenzoyldiphenylphosphine oxides, alpha-hydroxyketone, benzophenone derivatives, and 1,3-dioxolane.

The epoxy-amine composition can also include a Lewis acid or a compound that generates a Lewis acid upon the exposure to radiation.

The presence of acid scavengers, preferably cycloaliphatic epoxy resins, can significantly prolong the pot life of the epoxy-amine system.

Prior to its exposure to radiation, the epoxy-amine compositions of the present invention have a prolonged pot life. After exposure, the speed of curing of the epoxy-amine composition is significantly increased.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

An epoxy-amine composition of the present invention includes an epoxy resin, an amine curative, and a latent catalyst. The epoxy resins are organic compounds having terminal epoxy groups, preferably glycidyl ethers of bis-phenol A and bis-phenol F or novolacs. The amine curative preferably contains a substituted toluenediamine, such as dimethylthiotoluenediamine (DMTDA) and diethyltoluenediamine (DETDA). Ethacure® 100 curative, available from Albemarle Corporation, Baton Rouge, La., is an approximately 80:20 mixture of the 2,4- and 2,6-isomers of DETDA. Ethacure® 300 curative, also available from Albemarle Corporation, is an approximately 80:20 mixture of 2,4- and 2,6-isomers of DMTDA.

The epoxy-amine composition with such "slow" amine curatives needs a catalyst to increase its curing speed. Phenols and derivatives of phenols are preferably used as a catalyst for such epoxy-amine compositions. To prevent the immediate acceleration of the chemical interaction between epoxides and amines, a "hidden" or latent catalyst or curing agent is used. The latent catalyst preferably consists of esters of phenols and esters of derivatives of phenols, such as acetylsalicylic acid, resorcinol monoacetate, resorcinol diacetate, resorcinol monobenzoate, phenylacetate, phenylbenzoate, naphtylacetate, and diacetate of bis-phenol A. When the latent catalyst is added to the epoxy-amine composition, it does not cause the instant acceleration of the reaction between epoxides and amines, and thus the epoxy-amine composition can have a prolonged shelf life. In the presence of radiation, such as visible light, ultraviolet (UV) light, or an electron beam, the latent catalyst undergoes a photo-Fries rearrangement, in which the unstable ester groups break apart to generate an active catalyst group or active curing agent, phenolic hydroxyl groups, which accelerates/initiates the cure process of the epoxy-amine composition. Optionally, a Norrish-type cleavage following the Fries-rearrangement will generate a radical with the phenolic hydroxyl group that accelerates/initiates the cure process of the epoxy-amine composition.

Figure 1A:
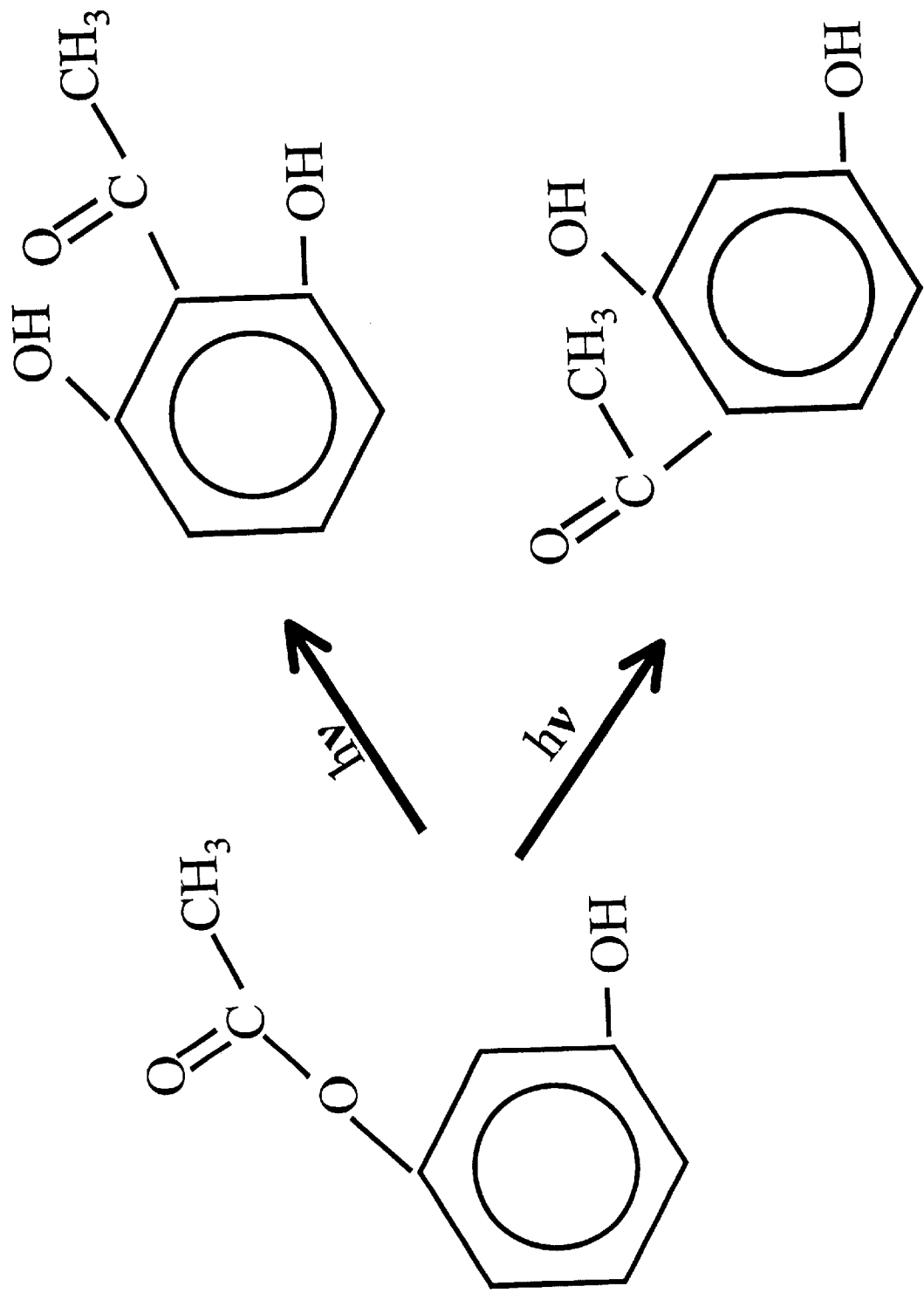
FIG. 1A shows photo-Fries rearrangement of resorcinol monobenzoate.
Figure 1B:
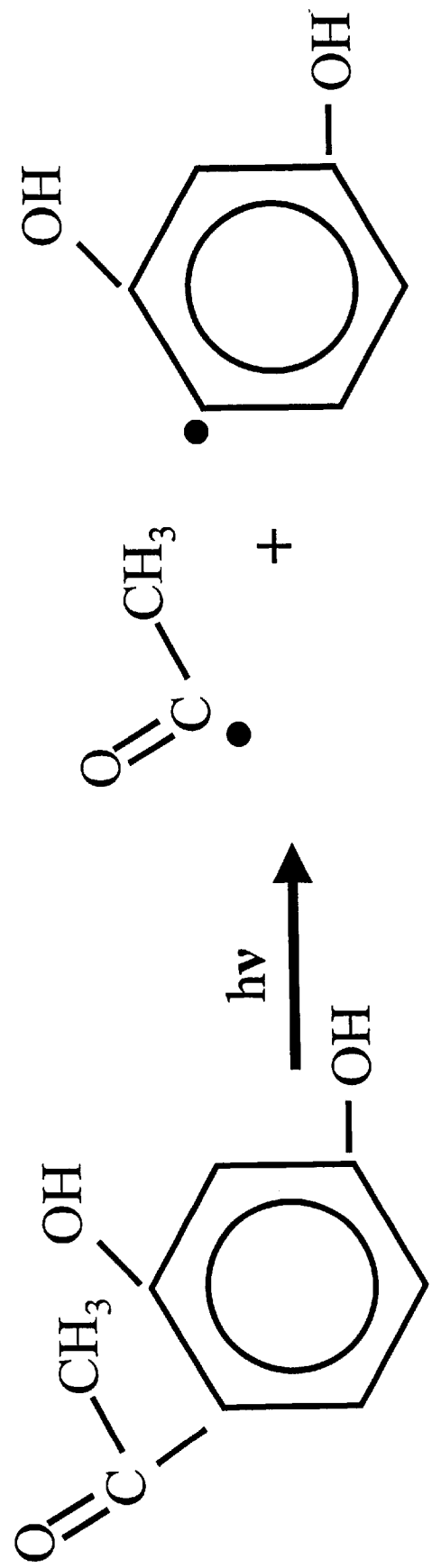
FIG. 1B shows Norrish-type cleavage following the photo-Fries rearrangement of FIG. 1A.

An example of a photo-Fries rearrangement followed by a Norrish-type cleavage of resorcinol monoacetate is shown in FIGS. 1A–1B. As shown in FIG. 1A, in the presence of a radiation source (hv), the ester group breaks apart to generate 2- and 6-isomers of acyl resorcinol. These isomers then break into two radicals as shown in FIG. 1B. The products of these reactions actively catalyze curing of epoxy-amine systems.

Sometimes, in order to further increase the shelf/pot life of the system, it is necessary to further inhibit the interaction among the catalyst, epoxides and amines. In these cases the epoxy-amine composition preferably further includes a proton-accepting compound containing oxygen atoms, which compete with the epoxy groups of the epoxy resin for accepting protons from the catalyst and amines. The proton-accepting compound preferably includes a mixture of 2,4,6-trimethylbenzoyldiphenylphosphine oxide, alpha-hydroxyketone and benzophenone derivatives (Esacure KTO46, available from Sartomer Company, Exton, Pa.) and 1,3-dioxolane.

The epoxy-resin composition can also include a Lewis acid, which participates in the Fries rearrangement. Alternatively, compounds that generate Lewis acids under the influence of radiation can also be used. This effect can be utilized when it is necessary to increase the rate of curing. However, this effect needs to be inhibited if it adversely affects the length of shelf/pot life of the system. In this case the epoxy-amine composition can also include acid scavengers, preferably cycloaliphatic epoxy resin, which significantly prolong the pot life of the epoxy-amine composition.

Furthermore, the epoxy-amine composition can also include photosensitizers, such as anthracene, pyrene, and benzophenone. The photosensitizers promote more effective active catalyst generation during irradiation of the epoxy-amine system.

Such epoxy-amine composition is useful for preparation of adhesives, coatings, sealants, shims, premixes, prepregs, laminates and composites.

ILLUSTRATIONS AND EXAMPLES

To supplement the foregoing disclosure, the following examples are provided to illustrate specific aspects of the invention.

However, it is to be understood that the examples are for illustrative purposes only, and in no manner is the present invention limited to the specific disclosures therein.

EXAMPLE 1

Three samples #1, #2 and #3 were placed separately in three 57 mm-I.D. crimped aluminum dishes. Samples #1 and #3, each of which contained 5 grams of novolac epoxy resin D.E.N.™ 431 with epoxy equivalent weight (E.E.W.) of 172–179 (available from Dow Chemical Company), 1.5 grams of dimethylthiotoluenediamine (Ethacure® 300) manufactured by Albemarle® Corporation, and 1 gram of resorcinol monoacetate (available from Sigma-Aldrich Company). Sample #2 contained 5 grams of novolac epoxy resin D.E.N.™ 431 and 1.5 grams of dimethylthiotoluenediamine (Ethacure® 300).

Samples #1 and #2 were exposed to UV light. The UV source was a high-intensity UV lamp model B-100YP with a 100 W spot bulb without filter (available from UVP, San Gabriel, Calif.). Samples #1 and #2 were placed on a massive 6 kg copper heat sink to keep temperature below 50° C., at a distance of 6 cm from the lamp for 30 minutes. After exposure to UV radiation, samples #1 and #2 were kept at ambient temperature for 60 minutes. Sample #3 was not exposed to UV light and was kept at ambient temperature for 90 minutes.

After that, all three samples were placed in an oven at 50±1° C. for 5 hours. It was observed that sample #1 was cured into a solid state, while samples #2 and #3 remained liquid.

EXAMPLE 2

Three samples #1, #2 and #3 were separately placed in three 57 mm-ID crimped aluminum dishes. Samples #1 and #3, each of which contained 5 grams of novolac epoxy resin D.E.N.™ 431, 1.5 grams of dimethylthiotoluenediamine (Ethacure® 300), and 1 gram of resorcinol monobenzoate (available from Sigma-Aldrich Company). Sample #2 contained 5 grams of novolac epoxy resin D.E.N.™ 431 and 1.5 grams of dimethylthiotoluenediamine (Ethacure® 300).

Similar to Example 1, samples #1 and #2 were exposed to UV light for 30 minutes and then were kept at ambient temperature for 60 minutes, while sample #3 was kept at ambient temperature for 90 minutes. All three samples were then placed in an oven at 50±1° C. for 5 hours.

It was observed that sample #1 was cured into a solid state, while samples #2 and #3 remained liquid.

EXAMPLE 3

Three samples #1, #2 and #3 were separately placed in three 57 mm-ID crimped aluminum dishes. Samples #1 and #3, each of which contained 5 grams of bis-phenol A epoxy resin EPON® 828 (available from Resolution Performance Products), 1.4 grams of dimethylthiotoluenediamine (Ethacure® 300), and 1 gram of resorcinol monobenzoate. Sample #2 contained 5 grams of bis-phenol A epoxy resin EPON® 828 and 1.4 grams of dimethylthiotoluenediamine (Ethacure® 300).

Similar to Example 1, samples #1 and #2 were exposed to UV light for 30 minutes and then were kept at ambient temperature for 60 minutes, while sample #3 was kept at ambient temperature for 90 minutes. All three samples were then placed in an oven at 50±1° C. for 5 hours. It was observed that sample #1 was cured into a solid state, while samples #2 and #3 remained liquid.

The results of Examples 1–3 demonstrate that latent catalysts significantly increase the rate of curing of epoxy-amine compositions when exposed to UV radiation.

EXAMPLE 4

Three samples #1, #2, and #3 were separately placed in three 57 mm-ID crimped aluminum dishes. Samples #1 and #2, each of which contained 5 grams of novolac epoxy resin D.E.N.™ 431, 1.5 grams of dimethylthiotoluenediamine (Ethacure® 300), and 1 gram of resorcinol monoacetate. Sample #3 contained 5 grams of novolac epoxy resin D.E.N.™ 431, 1.5 grams of dimethylthiotoluenediamine (Ethacure® 300), 1 gram of resorcinol monoacetate, and 0.003 gram of anthracene. Samples #1 and #3 were exposed to UV light. The UV source was a high-intensity UV lamp model B-100YP with a 100 W spot bulb without filter (available from UVP, San Gabriel, CALIF.). Two samples were placed on a massive 6 kg copper heat sink to keep temperature below 50° C., at a distance of 16 cm from the lamp for 30 minutes. Two samples then were kept at ambient temperature for 60 minutes.

Sample #2 was not exposed to UV light and was kept at ambient condition for 90 minutes.

After that all three samples were placed in an oven at 50±1° C. It was observed that, sample #3 was cured into a solid state after 2 hours, and sample #1 was cures into solid state after 6 hours, while sample #2 remained liquid after 10 hours. These results demonstrate that a photosensitizer significantly promotes active catalyst generation, which increases the speed of the curing process of the epoxy-amine composition.

EXAMPLE 5

Two samples #1 and #2 were separately placed in two 57 mm-ID crimped aluminum dishes. Sample #1 contained 5 grams of novolac epoxy resin D.E.N.™ 431, 1.5 grams of dimethylthiotoluenediamine (Ethacure® 300), and 1 gram of resorcinol monobenzoate. Sample #2 contained 5 grams of novolac epoxy resin D.E.N.™ 431, 1.5 grams of dimethylthiotoluenediamine (Ethacure® 300), 1 gram of resorcinol monobenzoate, and 0.075 gram of mixture of 2,4,6-trimethylbenzoyldiphenylphosphine oxide, oligo{2-hydroxy-2-methyl-1-[4-(1-methylvinyl)phenyl]propane}, methylbenzophenone derivatives (photoinitiator Esacure™ KTO46, available from Sartomer Company).

3 grams from each sample were collected and were placed in light-protected containers at ambient temperature. It was observed that sample #1 gelled in 24 hours, while sample #2 gelled in 48 hours. These results illustrate that a proton-accepting compound, such as KTO46, prolongs the shelf life of the epoxy-amine compositions.

Similar to Example 4, the remainders of both samples were exposed to UV light for 30 minutes and then were kept at ambient temperature for 60 minutes. After that the samples were then placed in an oven at 50±1° C. for 5 hours. It was observed that both samples were cured into solid state.

EXAMPLE 6

Two samples #1 and #2 were separately placed in two 57 mm-ID crimped aluminum dishes. Sample #1 contained 5 grams of novolac epoxy resin D.E.N.™ 431, 1.5 grams of dimethylthiotoluenediamine (Ethacure® 300), and 1 gram of resorcinol monobenzoate. Sample #2 contained 5 grams of novolac epoxy resin D.E.N.™ 431, 1.5 grams of dimethylthiotoluenediamine (Ethacure® 300), 1 gram of resorcinol monobenzoate, 0.075 gram of mixture of 2,4,6-trimethylbenzoyldiphenylphosphine oxide, oligo{2-hydroxy-2-methyl-1-[4-(1-methylvinyl)phenyl]propane}, methylbenzophenone derivatives (photoinitiator Esacure™ KTO46), and 0.075 gram of 1,3-dioxolane (available from Ferro Corporation).

3 grams from each sample were collected and were placed in light-protected containers at ambient temperature. It was observed that sample #1 gelled in 24 hours, while sample #2 gelled in 72 hours. These results illustrate that the addition of 1,3-dioxolane to Esacure™ KTO46 prolongs the shelf life of the epoxy-amine compositions more effectively than Esacure™ KTO46 alone.

Similar to Example 4, the remainders of both samples were exposed to UV light for 30 minutes and then were kept at ambient temperature for 60 minutes. After that the samples were then placed in an oven at 50±1° C. for 5 hours. It was observed that both samples were cured into solid state.

EXAMPLE 7

Two samples #1 and #2 were separately placed in two 57 mm-ID crimped aluminum dishes. Sample #1 contained 5 grams of novolac epoxy resin D.E.N.™ 431, 1.5 grams of dimethylthiotoluenediamine (Ethacure® 300), and 1 gram of resorcinol monoacetate. Sample #2 contained 5 grams of novolac epoxy resin D.E.N.™ 431, 1.5 grams of dimethylthiotoluenediamine (Ethacure® 300), 1 gram of resorcinol monoacetate, and 0.15 gram of cycloaliphatic epoxy resin ERL 4221 (available from Union Carbide).

3 grams from each sample were collected and were placed in light-protected containers at ambient temperature. It was observed that sample #1 gelled in 24 hours, while sample #2 gelled in 3 days. These results illustrate that acid scavengers effectively prolong the shelf life of the epoxy-amine compositions.

Similar to Example 4, the remainders of both samples were exposed to UV light for 30 minutes and then were kept at ambient temperature for 60 minutes. After that the samples were then placed in an oven at 50±1° C. for 5 hours. It was observed that both samples were cured into solid state.

It will be clear to one skilled in the art that the above embodiments may be altered in many ways without departing from the scope of the invention. Accordingly, the scope of the invention should be determined by the following claims and their legal equivalents.

What is claimed is:

1. An epoxy-amine composition comprising:
    a) an epoxy resin;
    b) an amine curative; and
    c) a latent catalyst that generates an active catalyst of epoxy-amine interaction upon exposure to a radiation source by undergoing an intramolecular rearrangement.
2. An epoxy-amine composition comprising:
    a) an epoxy resin;
    b) an amine curative; and
    c) a latent catalyst that generates an active catalyst upon exposure to a radiation source by undergoing a Fries rearrangement.
3. The epoxy-amine composition of claim 1 or 2, wherein the epoxy resin comprises a resin with terminal epoxy groups.
4. The epoxy-amine composition of claim 1 or 2, wherein the amine curative comprises a substituted toluenediamine.
5. The epoxy-amine composition of claim 4, wherein the amine curative is selected from the group consisting of dimethylthiotoluenediamine (DMTDA) and diethyltoluenediamine (DETDA).
6. The epoxy-amine composition of claim 1 or 2, wherein the latent catalyst is selected from the group consisting of esters of phenols and esters of derivatives of phenols.
7. The epoxy-amine composition of claim 6, wherein the latent catalyst is selected from the group consisting of acetylsalicylic acid, resorcinol monoacetate, resorcinol diacetate, resorcinol monobenzoate, phenylacetate, phenylbenzoate, naphtylacetate, and diacetate of bis-phenol A.
8. The epoxy-amine composition of claim 1 or 2, further comprising a proton-accepting compound.
9. The epoxy-amine composition of claim 8, wherein the proton accepting compound comprises at least one of 2,4,6-trimethylbenzoyldiphenylphosphine oxides, alpha-hydroxyketone, benzophenone derivative, and 1,3-dioxolane.
10. The epoxy-amine composition of claim 1 or 2, wherein the radiation source is selected from the group consisting of visible light, ultraviolet light and electron beam.
11. The epoxy-amine composition of claim 1 or 2, further comprising a Lewis acid.
12. The epoxy-amine composition of claim 1 or 2, further comprising a compound that generates a Lewis acid upon exposure to radiation.
13. The epoxy-amine composition of claim 1 or 2, further comprising an acid scavenging compound.
14. The epoxy-amine composition of claim 13, wherein the acid scavenging compound comprises a cycloaliphatic epoxy resin.
15. The epoxy-amine composition of claim 1 or 2, further comprising a photosensitizer.
16. The epoxy-amine composition of claim 15, wherein the photosensitizer is selected from the group consisting of anthracene, pyrene, and benzophenone.

* * * * *